Aug. 4, 1964 T. W. PANGBURN 3,143,132

SEAL ARRANGEMENT FOR A BUTTERFLY VALVE

Filed June 12, 1961 2 Sheets-Sheet 1

INVENTOR:
Thomas W. Pangburn,
BY
Bair, Freeman & Molinare
ATTORNEYS.

Aug. 4, 1964  T. W. PANGBURN  3,143,132
SEAL ARRANGEMENT FOR A BUTTERFLY VALVE
Filed June 12, 1961  2 Sheets-Sheet 2

INVENTOR:
Thomas W. Pangburn,
BY
Bair, Freeman & Molinare
ATTORNEYS.

United States Patent Office 3,143,132
Patented Aug. 4, 1964

3,143,132
SEAL ARRANGEMENT FOR A BUTTERFLY VALVE
Thomas W. Pangburn, Sewickley, Pa., assignor to Fisher Governor Company, a corporation of Iowa
Filed June 12, 1961, Ser. No. 116,345
5 Claims. (Cl. 137—375)

This invention relates in general to butterfly valves and more particularly to an improved seal arrangement for use in butterfly valves.

Butterfly valves incorporate a disc-like member which is rotatable upon a shaft either to open or close a port. In closing the port, the disc generally fills a circular area defined by a rubber or resilient liner which distorts under pressure of the disc to engage the disc along its periphery and thereby provide a complete seal. The problem of sealing this port is complicated, however, by the fact that the shaft upon which the disc rotates must protrude through the rubber or flexible liner, and, since the liner does not provide a solid support for the O-ring normally surrounding the shaft, leakage may occur between the ring and shaft.

It is therefore proposed in the present invention to provide the liner with an O-ring retainer or holder bonded thereto and through which the shaft is extended. This provides a distortionless surface with which the O-ring may coact to insure the proper seal. The bonding of the retainer prevents leakage between the retainer and liner. In addition, the retainer and O-ring are backed by a suitable self-lubricating bushing for the shaft and it is arranged to be sealed by another O-ring. Since the bushing is self-lubricating the problem of providing some entrance aperture through which lubricant may be inserted is avoided and an excellent secondary seal is therefore provided by the other O-ring.

It is accordingly an object of this invention to provide an improved construction for a butterfly type valve.

It is a further object of this invention to provide a flexible liner for the port of a butterfly valve in which a distortionless or non-flexible arrangement is provided for sealing the space between the valve shaft and the liner through which it extends.

It is another object of this invention to provide a butterfly valve in which the valve shaft is supported in self-lubricating bushings.

It is yet another object of the present invention to provide a butterfly valve in which a flexible liner defining the port has a retainer for an O-ring bonded thereto whereby the liner is sealed from leakage.

Figure 1:
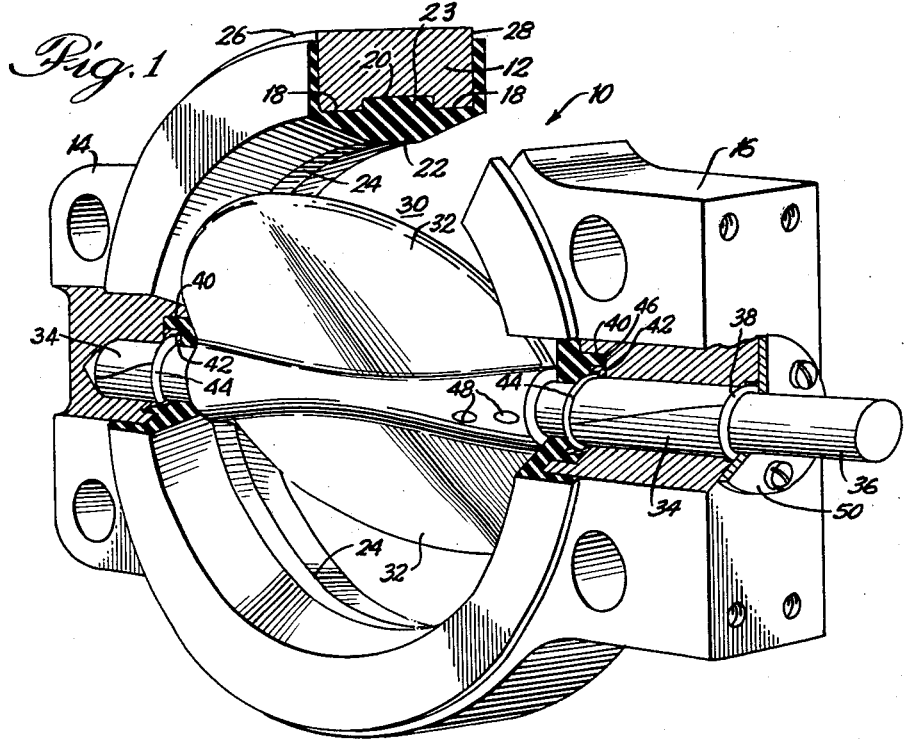
Figure 2:
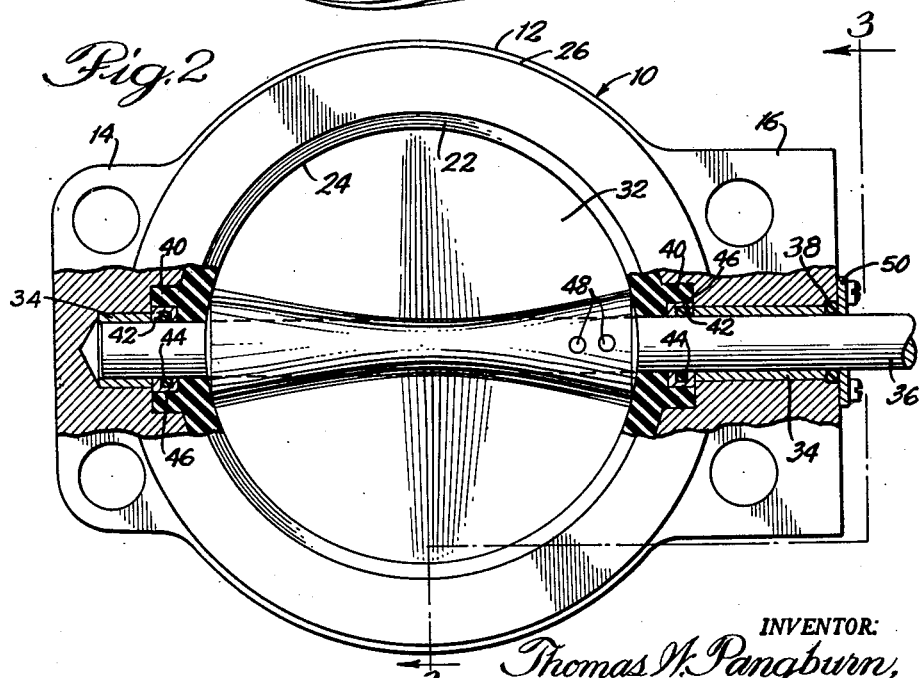
Figure 3:
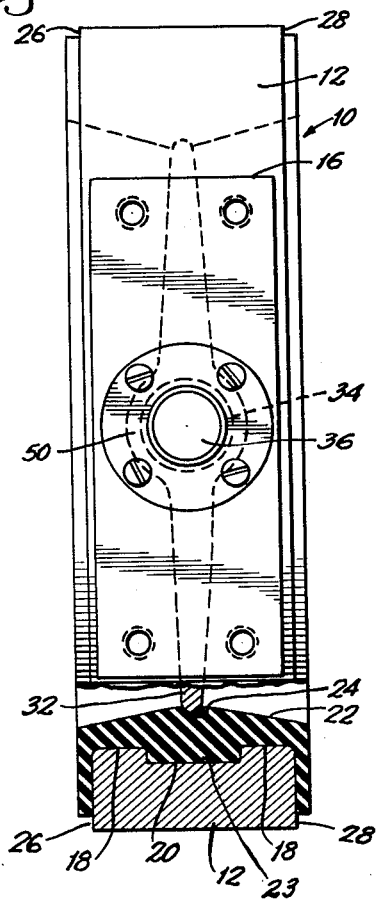

These and other objects of the present invention will become apparent on examination of the following specification, claims and drawings wherein:

FIGURE 1 is a perspective view of the butterfly valve;
FIGURE 2 is a front elevational view of the valve; and
FIGURE 3 is a sectional view of the valve taken through the line 3—3 in FIGURE 2.

The butterfly valve incorporating the principles of the present invention is illustrated in the drawings by the reference character 10. It comprises a valve body 12 from which the ears 14 and 16 protrude in diametrically opposing directions. These are provided with suitable apertures which permit the valve to be mounted on other apparatus or in turn have such apparatus mounted thereon. The valve body 12 has a circular opening defined by wall 18. The wall 18 defining the opening is provided with a peripheral recess or groove 20.

A suitable liner 22 made of a rubber such as butadiene-acrylonitrile copolymer, sold under the trade name "Hycar," or of polychloroprene, commonly known as neoprene, engages the opening in the valve body 12. It is of substantially U-shaped cross section and has a suitable projection 23 which is engaged with the groove 20 while its legs are engaged with the side walls 26 and 28 of the valve body. The liner 22 has a valve seating 24 which defines the valve opening or port 30 and against which the valve 32 seats to close the port.

The ears 14 and 16 are provided with aligned openings in which the respective bushings 34, the shaft 36 and the O-ring 38 are received. Each of these openings terminates in facing recesses defined by shoulders 40 in the wall of groove 20. The O-ring retainers 42 with the respective O-rings 44 form seals which are received within the confines of the respective shoulders 40 together with the respective projections 46 on the liner 22 and to which the retainers 42 are bonded. Each retainer 42 is provided with a respective aperture for receiving the shaft 36 and a peripheral recess in the wall of the retainer opening receives an O-ring 44. It will be noted that although the liner 22 is of a resilient material that each retainer 42 provides a solid distortionless support for the associated O-ring to prevent leakage between the O-ring seal and the shaft. Also, since each retainer is bonded to the liner 22, seepage cannot occur between the wall of liner 22 and the exterior of retainer 42.

After the liner 22 together with the retainers 42 and O-rings 44 are suitably assembled to the valve body 12, the circular or disclike valve 32 is placed in the port 30. The valve 32 has a central aperture which is aligned with apertures in the respective retainers 42 and the shaft 36 inserted therethrough. The shaft is inserted through the bushings 34 and the backing O-ring 38 which provides a secondary seal. The bushings 34 may comprise a plastic material such as polytetrafluoroethylene, commonly sold under the trade name "Teflon" and having well known self-lubricating qualities. A pair of tapered pins 48 are then driven through the valve 32 and shaft 36 to insure rotation of the valve with the shaft. The cover plate 50 is mounted on the ear 16 behind O-ring 38.

With this arrangement the valve 32 may be operated through rotation of the shaft 36 either manually or by suitable mechanical means, as desired, and the liner 22 will provide a suitable seal for the valve to prevent the passage of either liquid or gas through the port 30. The O-rings 44 and 38 will prevent the escape of the same past the shaft 36. The neoprene liner 22, of course, provides an excellent seal and is chemically inert, while the bonding of the retainer 42 to the liner 22 together with its O-ring 44 provides a stable seal which will resist displacement resulting from any distortion in the shape of the liner. The bushings 34, together with the O-ring 38, provide further backing for the seal, and, in addition, the self-lubricating qualitites of the bushing avoid the need for introducing lubricant whereby the entire butterfly valve presents a unitary structure requiring the minimum of maintenance or replacement of parts.

While a very useful and preferred embodiment of the invention has been described and illustrated, it will be apparent that various changes and modifications may be made in the construction and arrangement of the parts within the spirit and scope of the invention. It is intended that such changes and modifications be included within the scope of the appended claims.

What I claim as new and desire to secure by Letters Patent of the United States is:

1. A butterfly valve comprising a valve body having an opening, a flexible liner in said opening defining a port through which gaseous or liquid material may pass and having diametrically opposed apertures aligned with similar apertures in said body for receiving a shaft adapted to carry a rotatable valve for engagement with said liner to close said port, a retainer bonded in each liner aperture and having an opening through which said shaft passes, the wall defining said retainer opening having a recess therein, an O-ring in said recess for sealing the space around said shaft from the passage of said material, the outer wall of said retainer and a wall on said body engaging said liner therebetween, and a self-lubricating plastic bushing in each body aperture adjacent to and abutting one end wall of said retainer and engaging said shaft.

2. In the valve claimed in claim 1 a second O-ring disposed about said shaft and engaging one of said bushings remote from said one end wall and means for holding said second O-ring.

3. A butterfly valve comprising a valve body having a generally circular opening, a flexible liner in said circular opening defining a port through which a fluid material may pass, said liner having diametrically opposed apertures therethrough aligned with similar openings in said body for receiving a rotatable shaft carrying a valve for engaging said liner to close said port, a retainer bonded in each liner aperture and having an opening through which said shaft passes, the wall of said retainer defining said retainer opening having a recess therein, an O-ring in each said recess for sealing the space around said shaft from the passage of said fluid material, a bushing in each body opening engaging said shaft, a second O-ring disposed about said shaft and engaging a bushing at the end thereof remote from said liner, and means for holding said second O-ring.

4. A butterfly valve comprising a valve body having an opening in which a valve is supported by shaft means received through diametrically opposed openings in said body, a flexible liner disposed in said opening and arranged to define a port through which fluid material may pass and which is blocked by movement of said valve, said liner having a pair of shaft openings therethrough in alignment with said diametrically opposed openings in said body, an O-ring retainer bonded to the respective shaft openings in said liner and aligned with said diametrically opposed openings for passing said shaft means through said liner without the danger of leakage occurring between said retainer and liner, said retainer defining a recess therein adjacent said shaft means, an O-ring internally engaged in said recess in each of said retainers and around said shaft means for preventing leakage between said shaft means and said retainers, and bushing means in said diametrically opposed openings for journalling said shaft means, said bushing means comprising a self-lubricating bushing in each diametrically opposed opening in said valve body for engaging said shaft means, each bushing engaging an adjacent retainer to provide a backing for said adjacent retainer for preventing distortion of said liner.

5. In the valve arrangement claimed in claim 4, a cover plate received around said shaft and engaged against one wall of said body adjacent one end of one of said diametrically opposed openings, and an O-ring arranged between said cover plate and bushing.

References Cited in the file of this patent

UNITED STATES PATENTS

| | | |
|---|---|---|
| 2,816,729 | Jensen | Dec. 17, 1957 |
| 2,835,540 | Jorgensen | May 20, 1958 |
| 2,840,109 | Wadleigh | June 24, 1958 |
| 2,884,224 | Fawkes | Apr. 28, 1959 |
| 2,936,778 | Stillwagon | May 17, 1960 |
| 2,987,072 | Muller | June 6, 1961 |
| 3,000,609 | Bryant | Sept. 19, 1961 |
| 3,100,500 | Stillwagon | Aug. 13, 1963 |

FOREIGN PATENTS

| | | |
|---|---|---|
| 698,679 | Great Britain | Oct. 21, 1953 |